(12) United States Patent
Meinsen et al.

(10) Patent No.: US 7,822,780 B1
(45) Date of Patent: Oct. 26, 2010

(54) COMPUTERIZED METHOD AND SYSTEM FOR GENERATING PROCEDURES CAPABLE OF BEING USED WITH MULTIPLE DATABASES

(75) Inventors: David Meinsen, Independence, MO (US); David Costello, Gardner, KS (US); Ed Ryan, Overland Park, KS (US); G. Douglas Shaw, Raytown, MO (US)

(73) Assignee: Embarq Holdings Company, LP, Overland Park, KS (US)

( * ) Notice: Subject to any disclaimer, the term of this patent is extended or adjusted under 35 U.S.C. 154(b) by 894 days.

(21) Appl. No.: 10/969,534

(22) Filed: Oct. 20, 2004

(51) Int. Cl.
*G06F 17/30* (2006.01)

(52) U.S. Cl. .................. 707/802; 707/803

(58) Field of Classification Search ............ 707/802, 707/803
See application file for complete search history.

(56) References Cited

U.S. PATENT DOCUMENTS

| | | | | |
|---|---|---|---|---|
| 4,042,912 A * | 8/1977 | Bachman et al. ............ 707/802 |
| 5,544,357 A * | 8/1996 | Huei ........................ 707/715 |
| 5,678,044 A | 10/1997 | Pastilha et al. |
| 5,960,437 A * | 9/1999 | Krawchuk et al. .......... 707/702 |
| 5,987,251 A | 11/1999 | Crockett et al. |
| 6,081,804 A * | 6/2000 | Smith ...................... 707/696 |
| 6,108,662 A * | 8/2000 | Hoskins et al. ............ 700/95 |
| 6,131,190 A | 10/2000 | Sidwell |
| 6,202,201 B1 | 3/2001 | Domi |
| 6,223,173 B1 * | 4/2001 | Wakio et al. ............... 707/703 |
| 6,243,709 B1 * | 6/2001 | Tung ........................ 707/802 |
| 6,266,666 B1 * | 7/2001 | Ireland et al. .............. 707/770 |
| 6,266,808 B1 * | 7/2001 | Govindaraj ................ 717/106 |
| 6,389,481 B1 | 5/2002 | Malcolm |
| 6,430,708 B1 | 8/2002 | Evans |
| 6,546,133 B1 | 4/2003 | Temkin et al. |
| 6,564,203 B1 * | 5/2003 | Krishnaprasad et al. ..... 707/702 |
| 6,633,884 B2 * | 10/2003 | Martin et al. .............. 707/802 |
| 6,725,229 B2 * | 4/2004 | Majewski et al. ........... 707/769 |
| 6,763,358 B2 * | 7/2004 | Anderson et al. .......... 707/702 |
| 6,964,044 B1 | 11/2005 | Hudson et al. |
| 7,161,489 B2 * | 1/2007 | Sullivan et al. .......... 340/572.4 |
| 2002/0091821 A1 | 7/2002 | Katayama et al. |
| 2003/0084070 A1 | 5/2003 | Kliewe |

(Continued)

OTHER PUBLICATIONS

Non-Final Office Action date mailed Sep. 22, 2008 for U.S. Appl. No. 10/969,590.

(Continued)

*Primary Examiner*—Don Wong
*Assistant Examiner*—Kim T Nguyen
(74) *Attorney, Agent, or Firm*—Sonnenschein Nath & Rosenthal LLP

(57) ABSTRACT

Computerized methods and systems for generating procedures to be executed in mainframe computing environments, such procedures capable of being used with multiple databases are provided. The procedures are "generic" in that they contain an include member therein which, upon execution of the procedure, may be used to generate a database definition statement identifying the database on which the procedure is to be run. As such, generation and maintenance of only a single generic procedure is required when such procedure is to be run on multiple databases, significantly reducing the opportunity for human error that is associated with the generation and maintenance of the documentation necessary for jobs to be run in mainframe computing environments.

21 Claims, 1 Drawing Sheet

U.S. PATENT DOCUMENTS

| | | | |
|---|---|---|---|
| 2003/0177146 A1* | 9/2003 | Zimowski | 707/200 |
| 2003/0209528 A1* | 11/2003 | Choo et al. | 219/121.72 |
| 2003/0221184 A1 | 11/2003 | Gunjal et al. | |
| 2004/0098719 A1* | 5/2004 | Smith et al. | 718/101 |
| 2004/0103394 A1 | 5/2004 | Manda et al. | |
| 2004/0172632 A1* | 9/2004 | Smith et al. | 718/101 |
| 2006/0049250 A1* | 3/2006 | Sullivan | 235/385 |

OTHER PUBLICATIONS

Response filed Nov. 12, 2008 to Non-Final Office Action date mailed Sep. 22, 2008 for U.S. Appl. No. 10/969,590.
Final Office Action date mailed Feb. 4, 2009 for U.S. Appl. No. 10/969,590.
Non-Final Office Action date mailed May 14, 2008 for U.S. Appl. No. 10/969,537.
Response filed Jul. 25, 2008 to Non-Final Office Action date mailed May 14, 2008 for U.S. Appl. No. 10/969,537.
Non-Final Office Action date mailed Oct. 22, 2008 for U.S. Appl. No. 10/969,537.
SimoTime, "JCL Quick Reference", available on the internet on Jun. 28, 2003 at URL: <http://www.simotime.com/jclone01.htm> and archived by the web archive project at URL: <http://www.archive.org/web/web.php>.
MacFarland "xSeries Zips Through Java with zAAP", The Clipper Navigator Group, Apr. 7, 2004 (3 pages).
RCE/Amendment filed May 4, 2009 to Feb. 4, 2009 Final Office Action in U.S. Appl. No. 10/969,590.
Non-Final Rejection date mailed Jul. 17, 2009 in U.S. Appl. No. 10/969,590.
Response filed Sep. 18, 2009 to Non-Final Rejection dated Jul. 17, 2009 in U.S. Appl. No. 10/969,590.
Non-Final Rejection date mailed Jan. 6, 2010 in U.S. Appl. No. 10/969,590.
Response filed Jan. 29, 2010 to Non-Final Rejection dated Jan. 6, 2010 in U.S. Appl. No. 10/969,590.
Response filed Mar. 4, 2009 to Non-Final Action dated Oct. 22, 2008 in U.S. Appl. No. 10/969,537.
Final Rejection date mailed Jun. 25, 2009 in U.S. Appl. No. 10/969,537.
Response filed Aug. 20, 2009 to Final Rejection dated Jun. 25, 2009 in U.S. Appl. No. 10/969,537.
Examiner Interview Summary date mailed Aug. 21, 2009 in U.S. Appl. No. 10/969,537.
Advisory Action date mailed Sep. 21, 2009 in U.S. Appl. No. 10/969,537.
RCE/Amendment filed Sep. 25, 2009 in U.S. Appl. No. 10/969,537.
Non-Final Rejection date mailed Dec. 1, 2009 in U.S. Appl. No. 10/969, 537.
Response filed Dec. 31, 2009 to Dec. 1, 2009 Non-Final Rejection in U.S. Appl. No. 10/969,537.
Final Rejection date mailed Mar. 9, 2010 in U.S. Appl. No. 10/969,537.
RCE filed Jun. 9, 2010 in U.S. Appl. No. 10/969,537.
Final Office Action date mailed Jun. 16, 2010 in U.S. Appl. No. 10/969,590.
Non-final Office Action date mailed Jun. 29, 2010 in U.S. Appl. No. 10/969,537.

* cited by examiner ered in separate libraries. By way of example, contemplate

COMPUTERIZED METHOD AND SYSTEM FOR GENERATING PROCEDURES CAPABLE OF BEING USED WITH MULTIPLE DATABASES

CROSS-REFERENCE TO RELATED APPLICATIONS

This application is related by subject matter to the invention disclosed in the commonly assigned applications U.S. application Ser. No. 10/969,590, entitled "Computerized Method and System for Documenting a Process", and U.S. application Ser. No. 10/969,537, entitled "Computerized Method and System for Incorporating Control Card Functionality into a Procedure", each of which is filed on even date herewith.

STATEMENT REGARDING FEDERALLY SPONSORED RESEARCH OR DEVELOPMENT

Not applicable.

TECHNICAL FIELD

The present invention relates generally to jobs to be executed on a mainframe computer system. More particularly, the present invention relates to computerized methods and systems for generating procedures capable of being used with multiple databases, thereby eliminating the need for a separate procedure to be generated and maintained for each database on which the procedure is to be run.

BACKGROUND OF THE INVENTION

The term "job" is often used to describe a process to be carried out on a computer. Exemplary jobs which may be carried out on, for instance, a mainframe computer, include stopping all access to a database, restarting a database that has been stopped, copying a database (i.e., creating a duplicate database), and checking pointers in a database to ensure their validity. Generally, more than one item of documentation is necessary for a particular job to be executed, the number of items and the nature thereof being dependent upon the job for which execution is desired.

For instance, in mainframe computer environments, often times there are three separate items that are necessary for a job to be executed: a job member, a procedure, and one or more control cards. The job member generally provides at least one job card, for instance, setting forth a job name, and one or more statements which indicate what is to be executed (i.e., one or more execute statements). Generally, an execute statement identifies, at least the name of the procedure to be executed. The procedure is a set of JCL (Job Control Language) statements that, when executed, perform a given process. For instance, a procedure may indicate that the pointers in a database are to be checked to ensure their validity. Each procedure is specific to the database on which it is to be run and, thus, there is one procedure per database for each procedure to be run with respect thereto. The procedure also identifies the control cards necessary for it to be executed. A control card is a record defining what is to be done in the procedure. For instance, in the above-described example wherein the procedure indicates that the pointers in a database are to be checked, the procedure may indicate that a control card identifying which pointers are to be checked is necessary for it to be executed, e.g., a control card indicating that pointers X, Y, and Z are to be checked.

Each of the job member, the procedure, and the control card for a given job must be separately generated and maintained in separate libraries. By way of example, contemplate a situation wherein it is desirable to run a particular process, e.g., a pointer check, on 1500 different databases. In this situation, generation of 1500 job members, 1500 procedures, and 1500 control cards would be necessary, as would maintenance of a job documentation library containing the 1500 job members, a procedure library containing the 1500 procedures and a control card library containing the 1500 control cards. As each of these files is manually generated, multiple opportunities for human error arise.

Additionally, if a change in the procedure is desired, all 1500 procedures must be changed. For instance, if it is desired to change the above-described pointer checker procedure, all 1500 procedures must be changed, again, leaving open multiple opportunities for human error.

Accordingly, a method for reducing the number of opportunities for human error that are present in the generation and maintenance of the documentation necessary for jobs to be executed in a mainframe computing environment would be desirable. Additionally, a method for reducing the amount of documentation that must be generated and maintained for execution of jobs in a mainframe computing environment, particularly when a given action is to be executed on multiple files (e.g., databases) would be advantageous.

BRIEF SUMMARY OF THE INVENTION

The present invention provides methods, in a mainframe computing environment, for generating procedures capable of being utilized on multiple, separate databases. In one embodiment, the method includes receiving information pertaining to a job in Job Control Language, the job information having at least one execute statement identifying a procedure capable of being used with multiple databases and at least one parameter identifying a database. In this embodiment, the method further includes receiving information pertaining to the procedure identified in the execute statement, the procedure information having a first include member, wherein upon execution of the procedure at least one database definition statement is generated from the include member using the at least one parameter to identify the database. If desired, the method may further include expanding any symbolics in the at least one parameter with a Job Control Language expansion, wherein upon execution of the procedure, the at least one database definition statement is generated from the include member using the expanded parameter to identify the database.

The present invention further provides methods, in a mainframe computing environment, for executing a single procedure on multiple databases. In one embodiment, the method includes receiving information pertaining to a first job in Job Control Language, the first job information having a first execute statement identifying the procedure and a first parameter identifying a first database; receiving information pertaining to the procedure identified in the execute statement, the procedure information having an include member, wherein upon execution of the procedure a first database definition statement is capable of being generated from the include member using the first parameter to identify the first database; and executing the procedure, wherein the procedure is executed on the first database. In this embodiment, the method further includes receiving information pertaining to a second job in Job Control Language, the second job information having a second execute statement identifying the procedure and a second parameter identifying a second database, wherein upon execution of the procedure a second database definition statement is capable of being generated from the include member using the second parameter to identify the second database, and wherein upon execution of the procedure, the procedure is executed on the second database.

Computer-readable media having computer-executable instructions for performing the methods disclosed herein are also provided.

Additionally, the present invention provides computer systems for generating a procedure capable of being used with multiple databases, such procedures to be executed in a mainframe computing environment. In one embodiment, the computer system includes a first receiving module for receiving information pertaining to a job in Job Control Language, the job information having at least one execute statement identifying a procedure capable of being used with multiple databases and at least one parameter identifying a database. In this embodiment, the computer system further includes a second receiving module for receiving information pertaining to the procedure identified in the execute statement, the procedure information having a first include member, wherein upon execution of the procedure, at least one database definition statement is generated from the include member using the at least one parameter to identify the database. If desired, the computer system may further comprise an expansion module for expanding any symbolics in the at least one parameter with a Job Control Language expansion.

Still further, the present invention provides computer systems for executing a single procedure on multiple databases in a mainframe computing environment. In one embodiment, the method includes a first receiving module for receiving information pertaining to a first job in Job Control Language, the first job information having a first execute statement identifying the procedure and a first parameter identifying the first database; a second receiving module for receiving information pertaining to the procedure identified in the execute statement, the procedure information having an include member, wherein upon execution of the procedure, a first database definition statement is capable of being generated from the include member using the first parameter to identify the first database; and an execution module for executing the procedure, wherein the procedure is executed on the first database. If desired, the computer system may further comprise an expansion module for expanding any symbolics in the at least one parameter with a Job Control Language expansion.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

Figure 1:
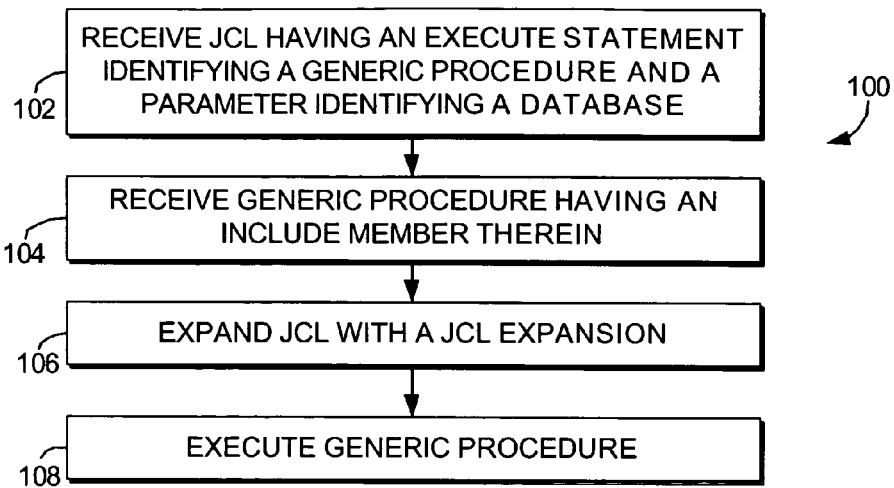
FIG. 1 is flow chart representative of a method, in a mainframe computing environment, for executing a generic procedure on a single database in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly set forth.

The present invention provides computerized methods and systems for genericizing procedures to be executed in mainframe computing environments, such that a given procedure may be executed on multiple databases. The present invention will be described more fully with reference to the accompanying figures, in which various exemplary embodiments of the invention are shown. It will be understood and appreciated by those of ordinary skill in the art that the present invention should not be construed as limited to the illustrated embodiments. Rather, the described embodiments are merely illustrative in nature.

It will be further understood by those of ordinary skill in the art that the present invention may be embodied, by way of example only, as a method, a data-communications system, and/or a computer-program product. Accordingly, in various embodiments, the present invention may take the form of a hardware embodiment, a software embodiment, or an embodiment combining hardware and software. Additionally, in one embodiment, the present invention may take the form of a computer-program product that includes computer-useable instructions embodied on a computer-readable medium.

In this regard, computer-readable media may include both volatile and nonvolatile media, removable and nonremovable media. By way of example, and not limitation, computer-readable media may include computer-storage media and communications media.

Computer-storage media may include media implemented in any method or technology for storing information. Examples of stored information include computer-useable instructions, data structures, program modules, and other data representations. Computer-storage media include, but are not limited to, RAM, ROM, EEPROM, flash memory or other memory technology, CD-ROM, digital versatile disks (DVDs), holographic media or other optical disk storage, magnetic cassettes, magnetic tape, magnetic disk storage, and other magnetic storage devices.

Communications media typically embody computer-useable instructions, including data structures and program modules, in a modulated data signal. The term "modulated data signal" refers to a propagated signal that has one or more of its characteristics set or changed to encode information in the signal. An exemplary modulated data signal includes a carrier wave. Communications media include any information-delivery media. By way of example, and not limitation, communications media may include wired media (such as a wired network or direct-wired connection), and wireless media such as acoustic, infrared, radio, microwave, spread-spectrum, and other wireless media technologies. Combinations of the above are included within the scope of computer-readable media.

Turning now to the drawing figures in general, and initially to FIG. 1 in particular, a method which may be implemented on a mainframe computing system environment, for executing a generic procedure on a single database in accordance with an embodiment of the present invention is shown and designated generally as reference numeral 100. By way of example only, the method may be used to eliminate the need for a separate procedure to be generated and maintained for each database on which the procedure is to be run.

Initially, at block 102, the system receives information pertaining to a job in Job Control Language (JCL), the job member having at least one execute statement identifying a generic procedure capable of being used with multiple databases and at least one parameter identifying a database. For example, contemplate a situation in which it is desirable to run a pointer check procedure on 1500 databases, the procedure checking only pointers X, Y, and Z. In this instance, the system would receive 1500 job members, each having an execute statement identifying the generic X, Y, Z pointer check procedure and a parameter identifying one of the 1500 databases on which the procedure is to be run, e.g., database A.

It will be understood and appreciated by those of ordinary skill in the art that, one or more control cards may still be necessary for the desired procedure to be run. For instance, the generic procedure may identify only that a pointer check procedure is to be run and include a reference to one or more control cards which identify which pointers (e.g., pointers X, Y, and Z) are to be checked. Additionally, the functionality of one or more control cards may be incorporated into the procedure itself as described in commonly assigned application U.S. application Ser. No. 10/969,537, entitled "Computerized Method and System for Incorporating Control Card Functionality into a Procedure", filed on even date herewith. All such variations are contemplated to be within the scope hereof.

Additionally, it will be understood and appreciated by those of ordinary skill in the art that the job member may include multiple additional parameters therein, whether required or optional. Such variations are contemplated to be within the scope of the present invention.

Subsequently, as indicated at block 104, the system receives information pertaining to the generic procedure identified in the execute statement of the job member. The procedure is considered "generic" as it has an include member therein which, upon execution of the procedure, is used to generate a database definition statement identifying the database on which the procedure is to be run, as more fully described below. For instance, in keeping with the above-described example, the system would receive information pertaining to the X, Y, Z pointer check procedure identified in the execute statement of the job member, the X, Y, Z pointer check procedure being generic in that it would have an include member therein.

If applicable, the system subsequently expands the job member with a JCL expansion, resolving any symbolics which may be included therein. This is indicated at block 106. Next, as indicated at block 108, the system executes the generic procedure generating a database definition statement from the include member using the parameter from the job member (in expanded form, if applicable) to identify the database. Thus, in the above-described example, the X, Y, Z pointer check procedure may be executed and a database definition statement generated from the include member specifying that the procedure is to be run on, e.g., database A.

Figure 2:
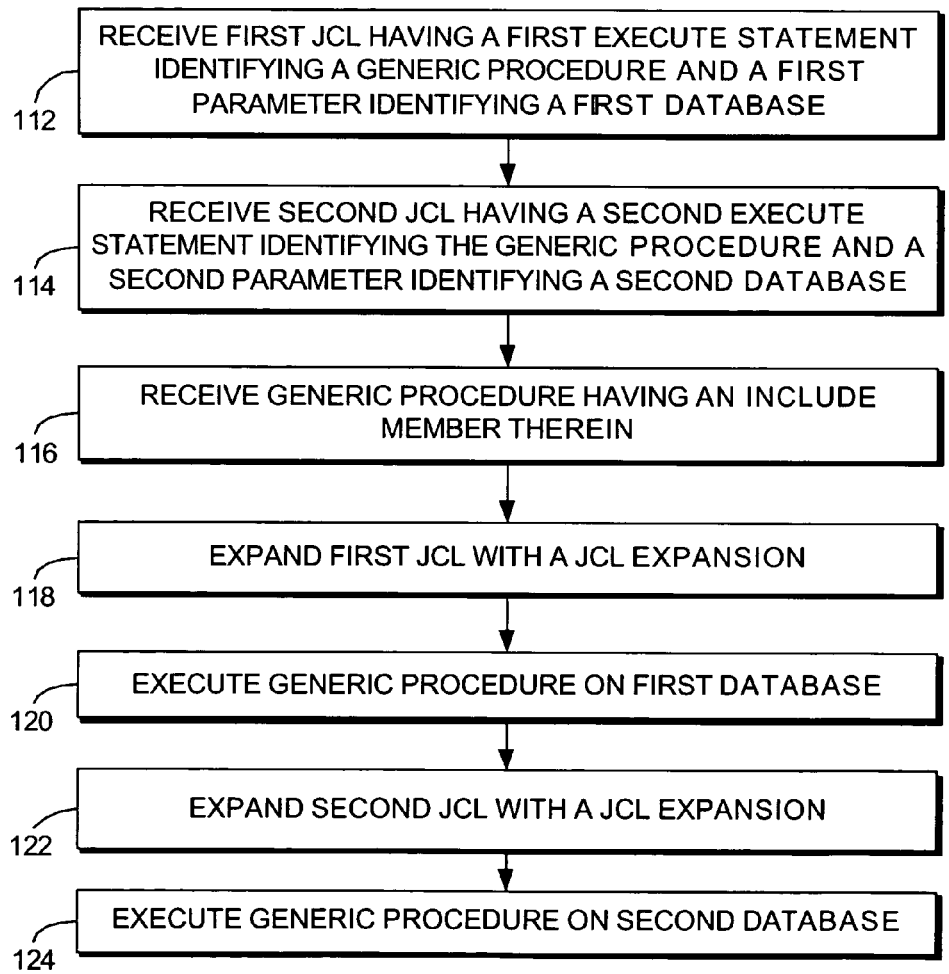
FIG. 2 is a flow chart representative of a method, in a mainframe computing environment, for executing a generic procedure on multiple databases in accordance with an embodiment of the present invention.

With reference now to FIG. 2, a method which may be implemented on a mainframe computing system environment for executing a generic procedure on multiple databases in accordance with an embodiment of the present invention is shown and designated generally as reference numeral 110. By way of example, and not limitation, the method may be used to eliminate the need for a separate procedure to be generated and maintained for each database on which the procedure is to be run. For instance, a single generic procedure may be generated to be run on multiple databases, e.g., database A and database B, as more fully described below.

Initially, at block 112, the system receives information pertaining to a first job in Job Control Language (JCL), the first job member having at least one execute statement identifying a generic procedure capable of being used with multiple databases and at least one parameter identifying a first database, e.g., database A. Subsequently, as indicated at block 114, the system receives information pertaining to a second job in JCL, the second job member having at least one execute statement identifying the same generic procedure identified in the first job member and at least one parameter identifying a second database, e.g., database B. For instance, contemplate a situation in which it is desirable to run a pointer check procedure on two separate databases, the procedure checking only pointers X, Y, and Z. In this instance, the system would receive two job members, each having an execute statement identifying the generic X, Y, Z pointer check procedure. The first job member would have a parameter identifying database A and the second job member would have a parameter identifying database B.

Subsequently, as indicated at block 116, the system receives information pertaining to the generic procedure identified in the execute statement of the first and second job members. As with the method 100 of FIG. 1, the procedure is considered "generic" as it has an include member therein which, upon execution of the procedure, is used to generate a database definition statement for each database on which the procedure is to be run, the database definition statement identifying the database. Thus, upon execution of the procedure, a database definition statement identifying database A will be generated, as will a database definition statement identifying database B, as more fully described below.

If applicable, the system subsequently expands the first job member with a JCL expansion, resolving any symbolics which may be included therein. This is indicated at block 118. Next, as indicated at block 120, the system executes the generic procedure with respect to the first database, generating a database definition statement from the include member using the parameter from the first job member (in expanded form, if applicable) to identify the database. Thus, in the above-described example, the X, Y, Z pointer check procedure may be executed and a database definition statement generated from the include member specifying that the procedure is to be run on database A.

Subsequently or simultaneously with respect to the first database, the system expands the second job member with a JCL expansion, resolving any symbolics which may be included therein. This is indicated at block 122. Again, subsequently, or simultaneously with respect to the first job member, the system executes the generic procedure with respect to the second database, generating a database definition statement from the include member using the parameter from the second job member (in expanded form, if applicable) to identify the second database. This is indicated at block 124. Thus, in the above-described example, the X, Y, Z pointer check procedure may be executed and a database definition statement generated from the include member specifying that the procedure is to be run on database B.

In summary, the present invention provides computerized methods and systems for genericizing procedures to be executed in mainframe computing environments such that a single procedure may be executed with respect to multiple databases. The methods and systems described herein eliminate the need for a separate procedure to be generated and maintained for each database on which the procedure is to be run. For example, if a pointer check procedure checking pointers X, Y, and Z is to be run on 1500 databases, rather than generating and maintaining 1500 job members and 1500 procedures, as would be required with the prior art methods, the present invention permits the generation and maintenance of only 1500 job members and a single generic procedure. Accordingly, the opportunity for human error in the generation and maintenance of the documentation necessary for jobs to be executed in a mainframe computing environment may be significantly reduced.

Additionally, if a change in the procedure is desired, e.g., if it is desirable to check all pointers rather than only pointers X, Y, and Z, only a single generic procedure must be changed. Recall that in the prior art methods, as a single procedure is necessary for each database on which it is to be run (since the procedures are database specific), a change in the procedure requires a change in, e.g., 1500 procedures (if the procedure is to be run on 1500 databases). Thus, the present invention presents significantly less opportunity for human error when a change in a given procedure is desired.

Although the invention has been described with reference to the preferred embodiments illustrated in the attached drawing figures, it is noted that substitutions may be made and equivalents employed herein without departing from the scope of the invention recited in the claims. For instance, additional steps may be added and steps may be omitted without departing from the scope of the invention.

The invention claimed is:

1. A method in a mainframe computing environment for generating a procedure capable of being used with multiple databases, the method comprising:

receiving information pertaining to a job in Job Control Language, the job information having at least one execute statement identifying a single procedure capable of being executed on a plurality of databases associated with a mainframe computer and at least one parameter identifying a database from the plurality of databases that the mainframe computer is to execute the job on; and receiving information pertaining to the single procedure identified in the execute statement, the information having a first include member, wherein upon execution of the single procedure at least one database definition statement is generated from the first include member using the at least one parameter to identify the database from the plurality of databases upon which the mainframe computer executes the job.

2. The method of claim 1, wherein the at least one parameter contains at least one symbolic which is capable of resolution upon Job Control Language expansion.

3. The method of claim 2, further comprising expanding the at least one parameter with a Job Control Language expansion, wherein upon execution of the single procedure the at least one database definition statement is generated from the include member using the expanded at least one parameter to identify the database.

4. The method of claim 1, wherein the information pertaining to the job includes at least one required parameter and at least one optional parameter.

5. A method in a mainframe computing environment for executing a single procedure on multiple databases, the method comprising:

receiving information pertaining to a first job in Job Control Language, the first job information having a first execute statement identifying the single procedure capable of being executed on multiple databases within the mainframe computing environment and a first parameter identifying a first database from the multiple databases associated with the mainframe computing environment;

receiving information pertaining to the single procedure identified in the execute statement, the information having an include member, wherein upon execution of the single procedure a first database definition statement is generated from the include member using the first parameter to identify the first database; and executing the procedure, wherein the procedure is executed on the first database.

6. The method of claim 5, wherein the first parameter contains at least one symbolic which is capable of resolution upon Job Control Language expansion.

7. The method of claim 6, further comprising expanding the first parameter with a Job Control Language expansion, wherein upon execution of the procedure, the first database definition statement is generated from the include member using the expanded first parameter to identify the first database.

8. The method of claim 5, further comprising receiving information pertaining to a second job in Job Control Language, the second job information having a second execute statement identifying the single procedure and a second parameter identifying a second database, wherein upon execution of the single procedure a second database definition statement is generated from the include member using the second parameter to identify the second database, and wherein upon execution of the procedure, the procedure is executed on the second database.

9. The method of claim 8, wherein the second parameter contains at least one symbolic which is capable of resolution upon Job Control Language expansion.

10. The method of claim 9, further comprising expanding the second parameter with a Job Control Language expansion, wherein upon execution of the procedure, the second database definition statement is generated from the include member using the expanded second parameter to identify the second database.

11. A computer system for generating a procedure configured to be used with multiple databases in a mainframe computing environment, the computer comprising:

a first receiving module for receiving information pertaining to a job in Job Control Language, the job information having at least one execute statement identifying a single procedure configured to be executed on multiple databases of the mainframe computing environment and at least one parameter identifying a database from the multiple databases of the mainframe computing environment;

a second receiving module for receiving information pertaining to the single procedure identified in the execute statement, the information having a first include member, wherein upon execution of the single procedure at least one database definition statement is generated from the include member using the at least one parameter to identify the database; and an execution module configured to execute the single procedure on the identified database.

12. The computer system of claim 11, wherein the at least one parameter contains at least one symbolic which is capable of resolution upon Job Control Language expansion.

13. The computer system of claim 12, further comprising an expansion module for expanding the at least one parameter with a Job Control Language expansion, wherein upon execution of the single procedure the at least one database definition statement is generated from the include member using the expanded at least one parameter to identify the database.

14. A computer system for executing a single procedure on multiple databases in a mainframe computing environment, the computer system comprising:
   a first receiving module for receiving information pertaining to a first job in Job Control Language, the first job information having a first execute statement identifying the single procedure capable of being executed on multiple databases within the mainframe computing environment and a first parameter identifying a first database from the multiple databases associated with the mainframe computing environment;
   a second receiving module for receiving information pertaining to the single procedure identified in the execute statement, the information having an include member, wherein upon execution of the single procedure a first database definition statement is generated from the include member using the first parameter to identify the first database; and
   an execution module for executing the procedure, wherein the procedure is executed on the first database.

15. The computer system of claim 14, wherein the first parameter contains at least one symbolic which is capable of resolution upon Job Control Language expansion.

16. The computer system of claim 15, further comprising an expansion module for expanding the first parameter with a Job Control Language expansion, wherein upon execution of the procedure, the first database definition statement is generated from the include member using the expanded first parameter to identify the database.

17. The computer system of claim 14, further comprising a third receiving module for receiving information pertaining to a second job in Job Control Language, the second job information having a second execute statement identify the single procedure and a second parameter identifying a second database, wherein upon execution of the single procedure a second database definition statement is capable of being generated from the include member using the second parameter to identify the second database, and wherein upon execution of the procedure, the single procedure is executed on the second database.

18. The computer system of claim 17, wherein the second parameter contains at least one symbolic which is capable of resolution upon Job Control Language expansion.

19. The computer system of claim 18, further comprising an expansion module for expanding the second parameter with a Job Control Language expansion, wherein upon execution of the procedure, the second database definition statement is generated from the include member using the expanded second parameter to identify the second database.

20. A computer-readable storage medium having computer-executable instructions for performing a method, in a mainframe computing environment, for generating a procedure capable of being used with multiple databases, the method comprising:
   receiving information pertaining to a job in Job Control Language, the job information having at least one execute statement identify a single procedure capable of being executed on multiple databases associated with the mainframe computing environment and at least one parameter identifying a database from the multiple databases associated with the mainframe computing environment; and
   receiving information pertaining to the single procedure identified in the execute statement, the information having a first include member, wherein upon execution of the single procedure at least one database definition statement is generated from the include member using the at least one parameter to identify the database.

21. A computer-readable storage medium having computer-executable instructions for performing a method, in a mainframe computing environment, for executing a single procedure on multiple databases, the method comprising:
   receiving information pertaining to a first job in Job Control Language, the first job information having a first execute statement identifying the single procedure capable of being executed on the multiple databases associated with the mainframe computing environment and a first parameter identifying a first database from the multiple databases associated with the mainframe computing environment;
   receiving information pertaining to the single procedure identified in the execute statement, the information having an include member, wherein upon execution of the single procedure a first database definition statement is generated from the include member using the first parameter to identify the first database; and
   executing the procedure, wherein the single procedure is executed on the first database.

* * * * *